(12) United States Patent
Tepper et al.

(10) Patent No.: US 11,507,773 B2
(45) Date of Patent: Nov. 22, 2022

(54) LARGE-SCALE SIMILARITY SEARCH WITH ON-CHIP CACHE

(71) Applicant: Intel Corporation, Santa Clara, CA (US)

(72) Inventors: Mariano Tepper, Portland, OR (US); Dipanjan Sengupta, Hillsboro, OR (US); Theodore Willke, Portland, OR (US); Javier Sebastian Turek, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 16/914,303

(22) Filed: Jun. 27, 2020

(65) Prior Publication Data

US 2020/0327365 A1 Oct. 15, 2020

(51) Int. Cl.
*G06K 9/62* (2022.01)
*H04L 9/06* (2006.01)
*G06N 20/00* (2019.01)

(52) U.S. Cl.
CPC ......... *G06K 9/6218* (2013.01); *G06K 9/6201* (2013.01); *G06K 9/6267* (2013.01); *G06N 20/00* (2019.01); *H04L 9/0643* (2013.01)

(58) Field of Classification Search
CPC .......................... G06K 9/6218–9/6227; G06K 10/762–10/7635; G06K 9/6267–9/6287; G06K 9/6272–9/6273; G06V 10/94; G06V 10/955; G06V 10/82; G06T 2207/20081; G06T 2207/20084; G06T 3/4046; G06T 9/002; G06N 3/063; G06N 3/02–3/105; G06N 20/00–20/20; G06F 12/0884; G06F 12/0893–12/0897; G06F 2212/60–2212/6082; G06F 12/0844–12/0855
See application file for complete search history.

(56) References Cited

U.S. PATENT DOCUMENTS

2015/0234876 A1* 8/2015 Chandrasekhar ... G06F 16/2246
707/737
2019/0042333 A1* 2/2019 Willhalm ............ G06F 12/0831
2019/0220202 A1 7/2019 Khan et al.

OTHER PUBLICATIONS

Medini et al., "Extreme Classification in Log Memory using Count-Min Sketch: A Case Study of Amazon Search with 50M Products", 33rd Conference on Neural Information Processing Systems (NeurIPS 2019), Vancouver, Canada, arXiv:1910.13830v1 [cs.LG] Oct. 28, 2019, pp. 1-17. (Year: 2019).*
Saen et al., "A Stochastic Associative Memory Using Single-Electron Tunneling Devices", IEICE Trans. Electron., vol. E81-C , No. I Jan. 1998, pp. 30-35. (Year: 1998).*

(Continued)

*Primary Examiner* — Brian Werner
(74) *Attorney, Agent, or Firm* — Jordan IP Law, LLC

(57) ABSTRACT

Systems, apparatuses and methods may store a plurality of classes that represent a plurality of clusters in a cache. Each of the classes represents a group of the plurality of clusters and the plurality of clusters is in a first data format. The systems, apparatuses and methods further modify input data from a second data format to the first data format and conduct a similarity search based on the input data in the first data format to assign the input data to at least one class of the classes.

25 Claims, 11 Drawing Sheets

(56) References Cited

OTHER PUBLICATIONS

Huang et al., "Extreme Classification in Log Memory," arXiv:1810.04254, Oct. 9, 2018, 12 pages.
Medini et al. "Extreme Classification in Log Memory using Count-Min Sketch: A Case Study of Amazon Search with 50M Products," arXiv:1910.13830, 33rd Conference on Neural Information Processing Systems, Oct. 28, 2019, 17 pages.
Dasgupta et al., "A neural algorithm for a fundamental computing problem," Science, vol. 358, Issue 6364 Nov. 10, 2017, pp. 793-796.
Malkov et al., "Efficient and robust approximate nearest neighbor search using Hierarchical Navigable Small World graphs," Mar. 30, 2016, 13 pages.
Johnson et al., "Billion-scale similarity search with GPUs," arXiv:1702.08734, Feb. 28, 2017, 12 pages.

\* cited by examiner

US 11,507,773 B2

LARGE-SCALE SIMILARITY SEARCH WITH ON-CHIP CACHE

TECHNICAL FIELD

Embodiments generally relate to training classifiers to leverage the benefits of on-chip cache and stochastic associative memories (SAM, e.g., 3d XPoint). More particularly, embodiments relate to selecting and searching relevant partitions of a database stored on the SAM through an efficient and enhanced on-chip selection process that utilizes the on-chip memory.

BACKGROUND

Content-based similarity search (e.g., a similarity search) may be fulfilled by machine learning (ML) and/or artificial intelligence (AI) applications (e.g., recommendation engines, visual search engine, drug discovery, etc.). For example, a database may include high-dimensional vectors. A query vector q of the same dimension may be matched (e.g., based on some similarity function such as Euclidean distance) against the database to identify database vectors that are similar and/or closest to query vector q. For example, a content-based image retrieval (CBIR) system as may identify similar images in a database using a query image. The feature extraction step involves a deep learning model. Moreover, in modern applications, these vectors may represent a wide array of categories, such as the content of images, sounds, or bioinformatic data, extracted and summarized by deep learning systems.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
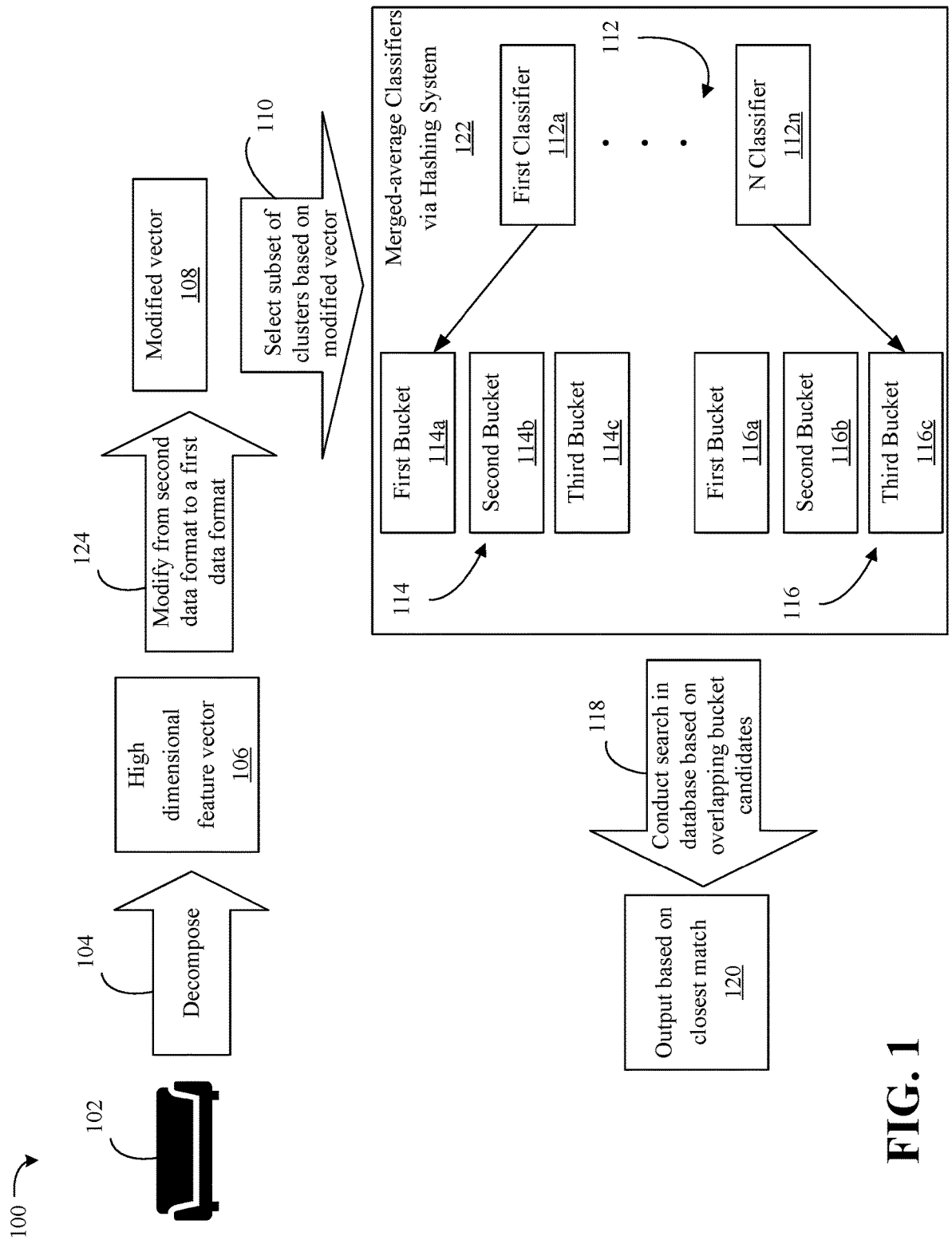
FIG. 1 is a process flow diagram of an example of a similarity search process according to an embodiment.

Turning now to FIG. 1, a similarity search process 100 is illustrated. As explained below, the similarity search process 100 may utilize an enhanced on-chip selector (e.g., an enhanced system-on-chip or SoC) to choose relevant partitions of a database for further analysis and consideration. The fast on-chip selector may exhibit a reduced memory footprint and allow for leveraging the benefits of a SAM, and fitting the selector data (e.g., the data the on-chip selector utilizes during similarity searching) in on-chip memory to reduce costly memory and data storage accesses. Thus, the similarity search process 100 may result in orders of magnitude faster searching based on an efficient and focused identification of partitions of a data store to explore for matches, and a focused Stochastic Associative Memory analysis (e.g., avoiding costly memory and data storage accesses) within the partitions.

Thus, some embodiments implement an accelerated similarity search system that performs most operations using a near-memory compute (e.g., a host processor memory). As such, the amount of data transferred from memory to the host processor may be reduced, enabling improved execution performance (e.g., 10,000 to 100,000 queries per second). Moreover, indexing as described below may reduce the memory footprint of the indexing by orders of magnitude to enable the use of on-chip memory and AWL.

In process 100, input data 102 (e.g., an image of a couch) is provided. The input data 102 may be decomposed 104 into a high dimensional feature vector 106. The high dimensional feature vector 106 may be a representation of the input data 102.

The high dimensional feature vector 106 may be modified from a second data format to a first data format that enables similarity searching. For example, the second data format may be a floating-point input data. The first data format may be a binary hash code that to allow for similarity computations (e.g., a Hamming distance between hash codes reflects their similarity in the input space). The high dimensional feature vector 106 may be modified from the second data format (e.g., floating-point input data) to the first data format (e.g., a binary hash code) 124 to generate the modified vector 108. Thus, the modified vector 108 may be a representation of the high dimensional feature vector 106.

Furthermore, as described below, the modified vector 108 may be compared against clusters in a database. For example, a database may be partitioned into clusters to reduce search speeds and times. The clusters may be in the form of the first data format to enable such similarity searches.

For example, in some embodiments, the database may be partitioned into groups or clusters where each group or cluster has an associated representative or centroid. A clustering method that clusters the database and, simultaneously, computes cluster representatives (e.g., centroids) in Hamming space may be executed. For example, a database of hash codes may be clustered based on one or more sparse binarization techniques. The generation of clusters may be executed offline.

The process 100 may then select a subset of clusters based on the modified vector 108, 110. For example, a selector may select a subset of clusters based on the hash code of the modified vector 108 for further analysis. The selector may be an SoC that includes one or more of a GPU, CPU, FPGA and/or other devices that have on-chip memories (e.g., caches) to store data and execute the aspects as described herein. As described below, the process 100 may enable a small memory footprint such that the selection of the subset of clusters may be implemented to work within on-chip memory (e.g., cache or near-memory compute) and search millions of clusters. Then, the binary hash code is searched within the subsets of clusters.

In some embodiments, first-N classifiers 112a-112n (e.g., a first classifier) may execute to classify the modified vector 108 into buckets 114 and 116. The buckets 114 and 116 may also be referred to as "classes." That is, each of bucket the buckets 114, 116 may be a distinct class that represents a plurality of clusters. The first-N classifiers 112a-112n and buckets 114, 116 may be a "merged-average classifiers via hashing" (MACHs) 122 system. The output from the first-N classifiers 112a-112n may be aggregated and merged to identify a subset of clusters for further exploration and analysis. Of note is that the data associated with the MACHs 122 may be stored in a cache of the SoC that implements the MACHs 122. For example, most, if not all, of the data of the buckets 114, 116 may be concurrently stored in a cache of the SoC. Furthermore, the first-N classifiers 112a-112n may execute on different execution units of the SoC to execute in parallel and reduce latency.

The first classifier 112a (e.g., logistic regression, a random forest, or a deep network) may be trained to classify data into the first-third buckets 114a-114c. The clusters may be divided into the first-third buckets 114a-114c according to a first 2-universal function. It is worth noting that each of the first-third buckets 114a-114c may represent a plurality of clusters that each correspond to a different possible output (e.g., type of object, person identification, category identification, etc.). For example, the first bucket 114a may correspond to three clusters (e.g., a dog cluster, cat cluster and couch cluster), the second bucket 114b may correspond to three clusters (e.g., a fishing rod cluster, bag cluster and computer cluster) and the third bucket 114c may include three clusters (e.g., corresponding to a phone cluster, server cluster and watch cluster). The buckets 114 may include representations of the clusters, such as centroids of the clusters (or hashed versions of the centroids), hashed representations of the clusters and/or centroids, and/or an index (e.g., a memory location and/or a unique value) to the cluster and/or centroid.

The N classifier 112n (e.g., a second classifier different from the first classifier, and may include logistic regression, a random forest, or a deep network etc.) may be trained to classify data into the first-third buckets 116a, 116b, 116c. The clusters may be divided into the first-third buckets 116a-116c according to a second 2-universal function different from the first 2-universal function. It is worth noting that each of the first-third buckets 116a-116c may be constituted differently (represent different clusters) than the first-third buckets 114a-114c. For example, the first bucket 116a may correspond to three clusters (e.g., a fishing rod cluster, cat cluster and watch cluster), the second bucket 114b may correspond to three clusters (e.g., dog cluster, bag cluster, and server cluster) and the third bucket 114c may include three clusters (e.g., corresponding to a computer cluster, phone cluster, and couch cluster). The N classifier 112n may also be different from the first classifier 112a.

The first classifier 112a may classify the modified vector 108 into first bucket 114a. The N classifier 112n may classify the modified vector 108 into the third bucket 116c. A most likely classification for the modified vector 108 may be the overlapping cluster(s) between the selected first bucket 114a selected by the first classifier 112a and selected third bucket 116c selected by the N classifier 112n. That is, the most probable cluster is the common clusters (intersection) between the selected first bucket 114a and selected third bucket 116c. Thus, the search space may be reduced as not every cluster may necessarily be compared to the modified vector 108 for similarity. Rather, a series of lightweight classifications may provide insight into the categorization of the modified vector 108 without incurring as much overhead as would a comparison to every potential centroid or cluster. In this above example, the overlapping cluster between the first bucket 114a and the third bucket 116c is the couch cluster.

The process 100 may conduct a search in the database based on overlapping bucket candidates 118. For example, the couch cluster may be searched with further refinement based on the overlapping bucket candidates to identify a closest match. For example, an exact match for the couch may be identified within the couch cluster. In some embodiments, more than one cluster may be identified by the first-N classifiers 112a-112n. For example, hypothetically, a plurality of clusters (e.g., couch cluster and fishing rod cluster) may be common between the first bucket 114a and third bucket 114c, or other classifiers 112 may classify the modified vector into other subsets of clusters (e.g., fishing rod cluster, etc.). If so, then a stochastic associative search (SAS) may be executed on an SAM (e.g., an off-board, column and read enabled data storage) that stores the plurality of clusters to identify a most likely candidate cluster from the plurality of clusters identified by the MACHs 122. Clusters not identified by the MACHs 122 may not need to be searched further by the SAM. Thus, the process 100 may identify an output based on a closest match 120, which in this particular example may be an identification that the input data 102 and/or modified vector 108 correspond to a couch since the couch cluster overlaps with the first bucket 114a and third bucket 116c.

Thus, the entirety of a database of clusters and/or centroids need not be searched in the database or SAM. Rather, a focused search within specific clusters and/or centroids may be executed in the SAM to reduce latency.

In some embodiments, the MACHs 122 may build the different first-N classifiers 112a-112n as follows. "C" may be a collection of clusters. Data X may be assigned to a cluster, and the index of the cluster may be label(x). That is, label(x) belongs to a dataset $\{1, 2, \ldots, |C|\}$, where $|C|$ is the size of the collection C. A "classifier f" to predict cluster labels (e.g., f (x) label(x)) may be trained based on a dataset of pairs (e.g., (x, label(x))). As already noted, the classifiers 112a-112n may not provide a unique answer when queried for a match against input data 102. Instead, the MACHs 122 may determine class probabilities predicted by the first-N classifiers 112a-112n to produce a shortlist of clusters (e.g., candidates for final selection). Thereafter and/or concurrently with the shortlist generation, a memory system (e.g., a memory controller) may execute a linear scan among the clusters to determine a cluster closest to the input data 102.

Some embodiments may include a large number of classification labels (e.g., representations, centroids and/or clusters). The classification labels may be a number "C.", Some embodiments may utilize first-N classifiers 112a-112n to perform matching with a memory complexity or footprint of only $O(d^* \log C)$, where d is the size of each classifier of the first-N classifiers 112a-112n. The logarithmic property associated with the memory footprint may permit nearly all, if not the entire, information for similarity matching by the MACHs 122 to be simultaneously stored in the on-chip cache, which may result in orders of magnitude speedup in overall search pipeline on a SAM.

Thus, in some embodiments the MACHs 122 may randomly merges $|C|$ classes into B random meta-classes or first-third buckets 114a-114c and first-third buckets 116a-116c and (B is a manageable number, much smaller than $|C|$)

using a 2-universal function. In some embodiments, the process is repeated R=O(log |C|) times, using an independent 2-universal hashing scheme each time. The MACHs 122 may then execute different classifiers (e.g., logistic regression, a random forest, or a deep network) during training on each of the R meta-class classification problems. During querying, the MACHs 122 may aggregate the output from each of the R classifiers to obtain the predicted subset of clusters among the original |C| classes. In some embodiments, lightweight classifiers may be implemented such as logistic regression to reduce overhead.

Thus, some embodiments may implement a large-scale similarity search commonly handled by clustering databases. During querying, the clustering-related operations, such as the cluster selection step, may hinder the system's performance. The query performance in general depends linearly on the number of accesses to the main memory storing the cluster representative. Present embodiments may execute a similarity search pipeline using SAM (e.g., column-read enabled memory) in Hamming space and reduce the number of accesses to the main memory. Present embodiments may further execute a similarity search system with a Fast On-chip Selector to address the cluster selection, which may be executed without the need to access the slower off-chip Dynamic random-access memory (DRAM) and/or stochastic associative memory unless further refinement is desired. Doing so may significantly improves the runtime performance of our search pipeline by orders of magnitude on modern, large-scale (order of billions), complex, and high-dimensional databases.

As noted, some embodiments may reduce memory size to allow data to be contained in the cache. For example, a classifier size may denote the memory required for each classifier (e.g., d for logistic regression, d·B for a classification tree, etc.). The classifier speed denotes the complexity of inference for each classifier (e.g., d for logistic regression, d·log B for a classification tree, etc.). Thus, MACH analysis may require O(classifier size·log |C|) memory (this may be in the order of a few kilobytes for logistic regression to a few megabytes for random forests) and O(C|C| log |C|+classifier speed·log) operations for inference. Thus, some embodiments may remove from memory the linear dependency in |C|. This may allow the Fast On-chip Selector data associated with the embodiments described herein methods described herein to have faster memory accesses (e.g., all data fits into the on-chip memory of CPU/GPU/FPGA), even when |C| is very large (billion samples).

Figure 2:
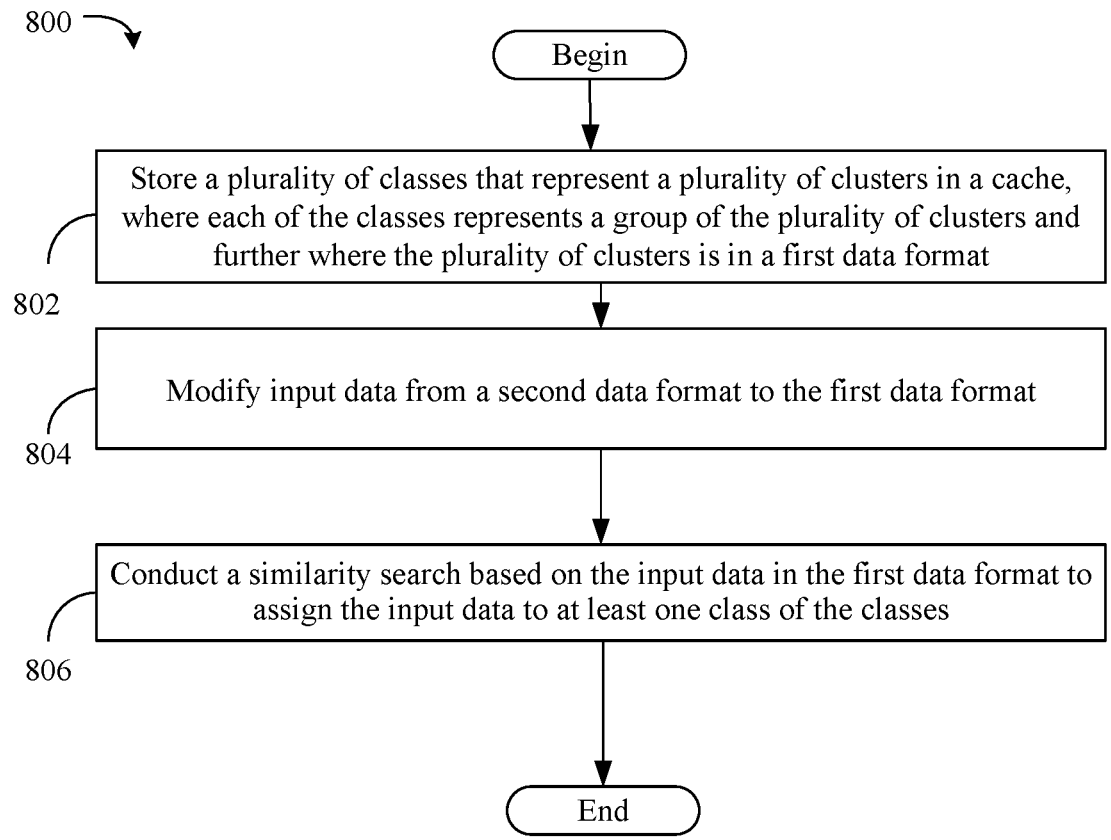
FIG. 2 is a flowchart of an example of a method of executing a search process according to an embodiment.

FIG. 2 shows a method 800 of a search process. The method 800 may generally be implemented with the embodiments described herein, for example, the process 100 (FIG. 1), already discussed. In an embodiment, the method 800 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 800 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 802 stores a plurality of classes that represent a plurality of clusters in a cache, where each of the classes represents a group of the plurality of clusters and further where the plurality of clusters is in a first data format. As described above, each class may also be referred to as a bucket. Illustrated processing block 804 modifies input data from a second data format to the first data format. Illustrated processing block 806 conducts a similarity search based on the input data in the first data format to assign the input data to at least one class of the classes.

Illustrated processing block 806 conducts a similarity search based on the input data in the first data format to assign the input data to at least one class of the classes. For example, processing block 806 the similarity search includes a Merged-Averaged Classifiers via Hashing process on the first data in the first data format to classify the first data into at least two classes of the at least one class. Some embodiments may further classify, with a first classifier, the input data in the first data format to a first class of the at least one class, classify, with a second classifier, the input data in the first data format to a second class of the at least one class, and conduct an identification that at least one cluster from the plurality of clusters is represented by both the first class and the second class to execute the similarity search. For example, the at least one cluster may include at least two classes, and the method 800 further includes in response to the identification, executing a stochastic associative search associated with the at least two clusters to identify a final cluster from the at least two clusters that is highly similar to the input data, and assigning the input data to the final cluster. In some embodiments, a stochastic associative memory stores the plurality of clusters.

Thus, the similarity search method 800 may result in orders of magnitude faster searching based on an efficient (e.g., avoiding costly memory and data storage accesses) and focused identification of partitions of a data store to explore for matches. Thereafter, a focused Stochastic Associative Memory analysis within the partitions may be executed. Doing so may reduce data storage accesses to reduce latency, reduce power consumption and utilize resources more effectively.

Figure 3:
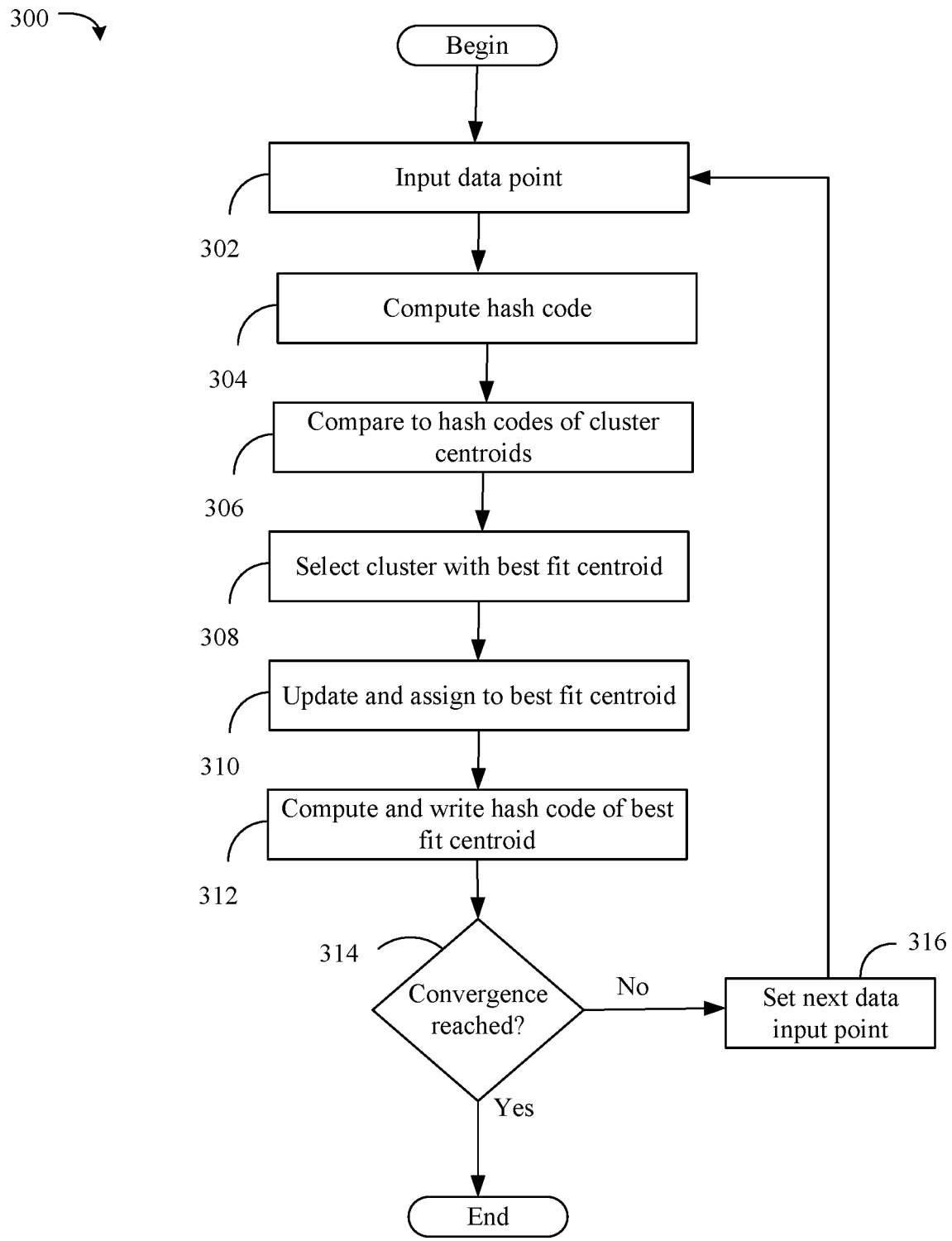
FIG. 3 is a flowchart of an example of a method of offline clustering according to an embodiment.

FIG. 3 shows an offline clustering method 300 that clusters a database and simultaneously computes cluster representatives (e.g., centroids) in Hamming space. The method 300 may generally be implemented with the embodiments described herein, for example, the process 100 (FIG. 1) and/or the method 800 (FIG. 2) already discussed. The method 300 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

An input database of hash codes may be clustered by method 300. The input database may be modified through a sparse binarization technique as described below. Illustrated processing block 302 identifies an input data from the input database. Illustrated processing block 304 computes a hash code of the input data point (e.g., through a sparse binarization technique to convert the input data point from a second data format to a first data format as described in some embodiments). Illustrated processing block 306 compares the hash code of the input data to hash codes of cluster centroids (e.g., cluster centroids that were already identified). Illustrated processing block 306 may compute the Hamming distance from the cluster representatives or centroids to the input point. This search may be conducted in a SAM using SAS.

Illustrated processing block 308 selects the cluster with the best fit centroid. For example, processing block 308 assigns the input point to the cluster of a closest representative based on the Hamming distances. For example, a best fit centroid may have the lowest Hamming distance with respect to the input data point. Illustrated processing 310 may update the selected centroid and assign the input data point to the best fit centroid. Illustrated processing 312 may further update the centroid. For example, illustrated processing block 312 computes and writes the hash code of the best fit centroid. For example, processing block 312 may include identifying the assignment, updating the cluster representative (centroid) and using some aggregation operator (e.g., mean/median/center of mass of all points) assigned to a single cluster. In some embodiments, the Hamming distance projection to maintain every cluster representative in Hamming space may be amenable to fast searches in stochastic associative memory. Illustrated processing block 314 determines whether convergence (i.e., no change in the set of representatives is observed) is reached. If not, illustrated processing block 316 may set the next data input point, and the method 300 executes again.

If convergence is reached, the method 300 may end and the clusters (e.g., centroids) may be accessed for query matching. Thus, the method may generate a database of clusters having centroids and store the database into an SAM for query access and processing. For example, the SAM may be partitioned so that each partition includes a single cluster. The clusters and centroids may be in the first data format.

The following pseudocode may be used for training and inference of cluster selection using extreme clustering technique in Hamming Space:
input: Training data set $D=\{(h_i, y_i)\}_{i=1}^n$, where $x_i \in R^D$ and $y_i \in \{1, \ldots, M\}$ represent class/cluster labels, number R of independent models, number B of meta-classes per model.
output: MACH classifier for extreme classification and centroid search.
Function train(D) is
   initialize R 2-universal hash functions $u_1, \ldots, u_R$ with B buckets each;
   for r=1, ..., R do $D_r = \{(h_i, u_r(y_i))\}_{i=1}^n$;

train a multi-class classifier $f_r: R^D \to R_+^B$ using $D_r$;
Function predict(h) is
   let $P \in R^{R \times B}$ initialized with zeros;
   for r=1, ..., R do
     $(P)_r \leftarrow f_r(h)$; // get probabilities for each meta-class in [B]
   for j=1, ..., M do
     score[j] $\leftarrow 1/R \sum_{r=1}^R (P)_{r,l}$, where $l=u_r(j)$;
   return score 1

Function centroid_search(h) is
   score predict (h);
     keep the indices of the largest elements in score.

Figure 4:
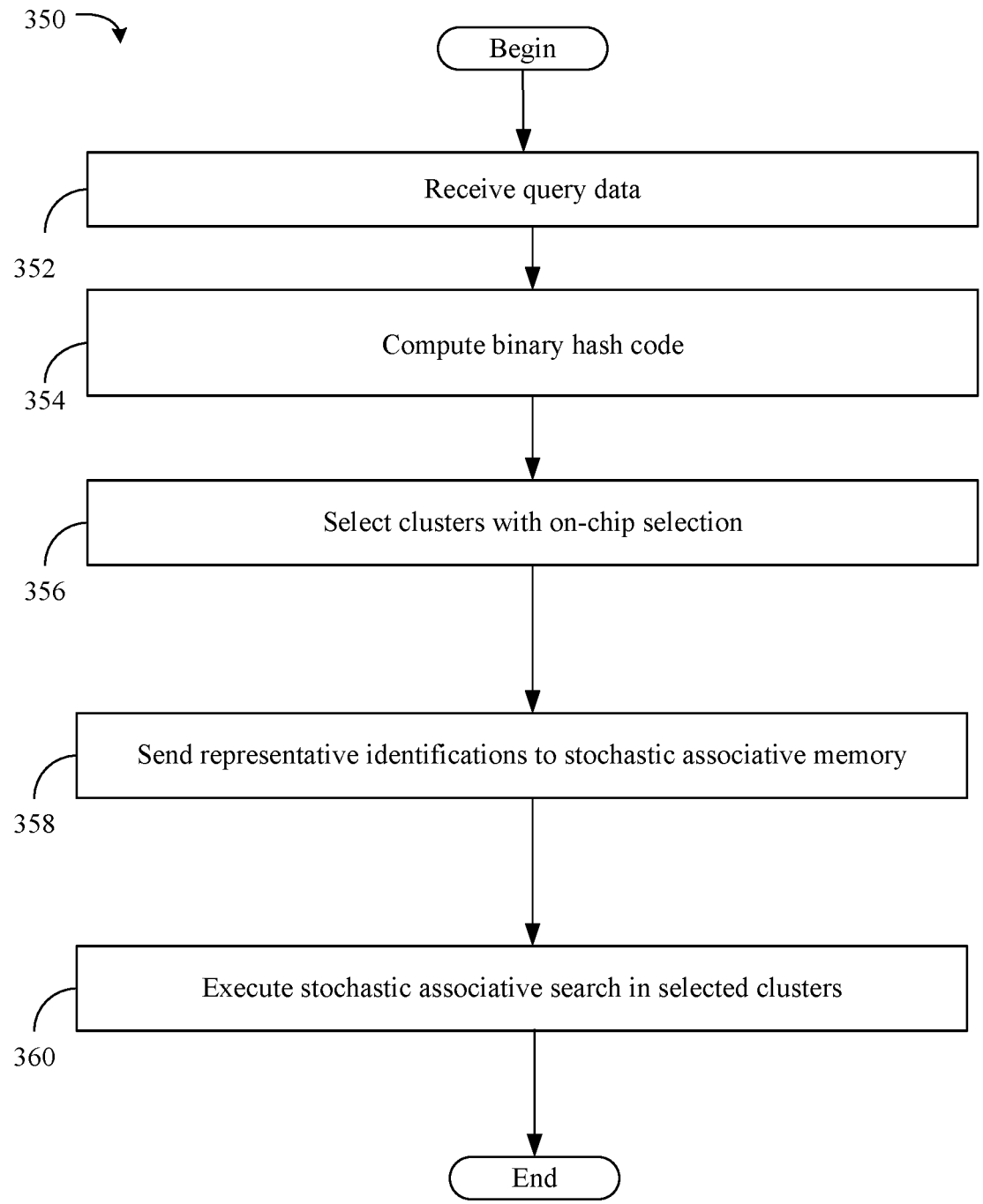
FIG. 4 is a flowchart of an example of a method of query processing using stochastic associative memory and chip selection according to an embodiment.

FIG. 4 shows query processing using stochastic associative memory and an enhanced on-chip selector method 350. The method 350 may generally be implemented with the embodiments described herein as, for example, the process 100 (FIG. 1), the method 800 (FIG. 2) and/or the method 300 (FIG. 3) already discussed. The method 350 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 352 receives query data. Illustrated processing block 354 computes the binary hash code of the query data. The hashing process may be the same as the hashing process as the partitioning (e.g., clustering) of the database, for example as described with respect to method 300 of FIG. 3. Illustrated processing block 356 selects clusters with an on-chip selection (e.g., using data stored in the on-chip memory). For example, a fast on-chip selector selects a subset of clusters based on the hash code. The selection may be based on centroids of the clusters and with a MACH method as described herein.

Illustrated processing block 358 sends representative identification (e.g., index, data address, etc.) of the subset of clusters to a SAM that stores the clusters. Illustrated processing block 360 may execute a SAS in the subset of clusters to identify a closest fit cluster that has a closest Hamming distance to the hashed query data. In some embodiments, the closest fit cluster is selected as the output and displayed to a user.

Figure 5:
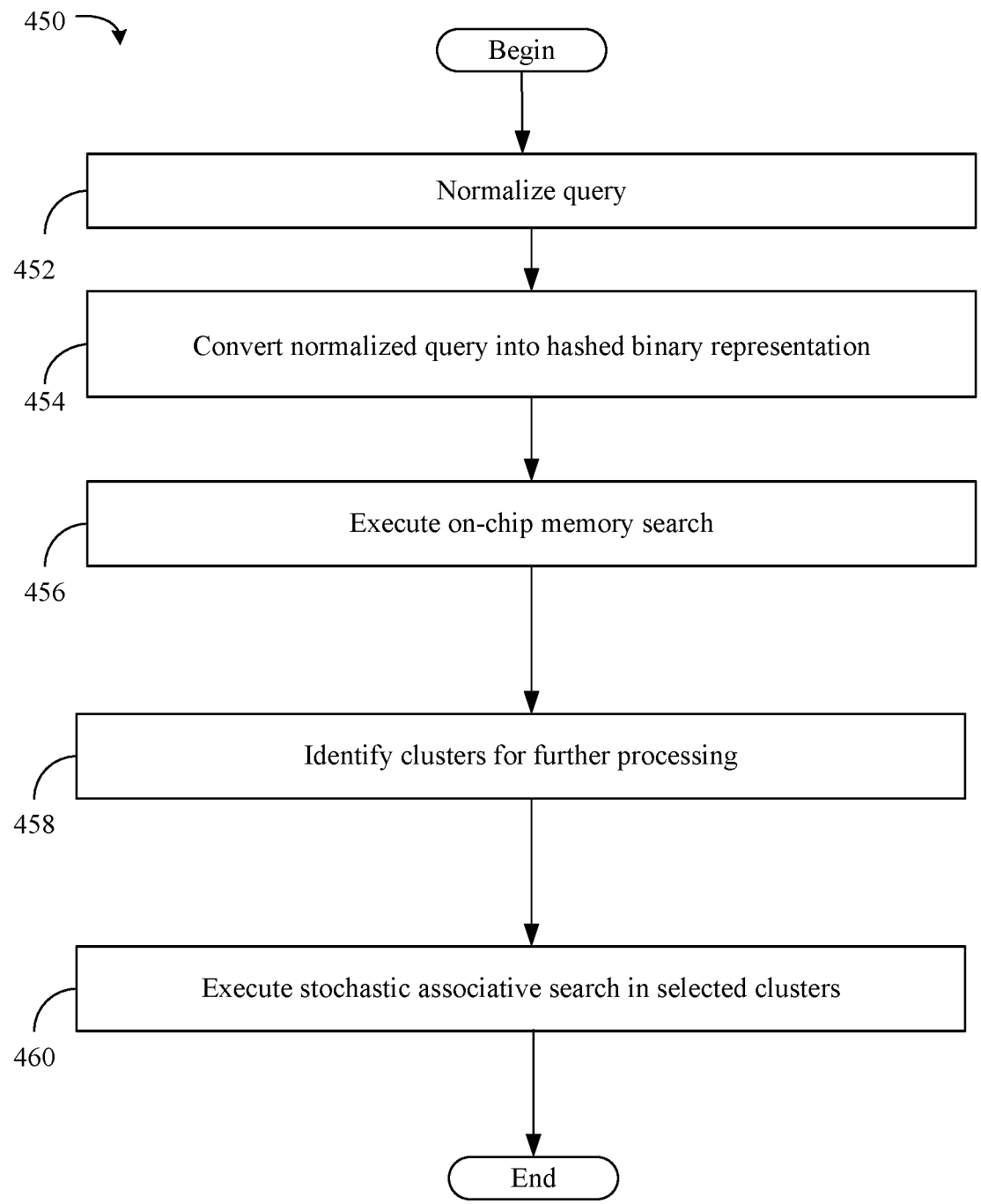
FIG. 5 is a flowchart of an example of a method of similarity search according to an embodiment.

FIG. 5 shows a similarity search method 450. The method 450 may generally be implemented with the embodiments described herein, for example, the process 100 (FIG. 1), the method 800 (FIG. 2), the method 300 (FIG. 3) and/or the method 350 (FIG. 4) already discussed. The method 450 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 452 may receive a query and normalize the query (e.g., removing noise, errant characters, convert to a specific format, etc.). Illustrated processing block 454 converts the normalized query into a hashed binary representation. Illustrated processing block 456 executes an on-chip memory search. Illustrated processing block 458 identifies clusters for further processing. For example, processing block 456 may determine that the hashed binary representation may correspond to several clusters. Illustrated processing 458 may identify the clusters and indexes thereof. Illustrated processing block 460 may execute a stochastic association search in the selected clusters to identify a cluster that is closest to the query and/or an answer of the query.

Figure 6:
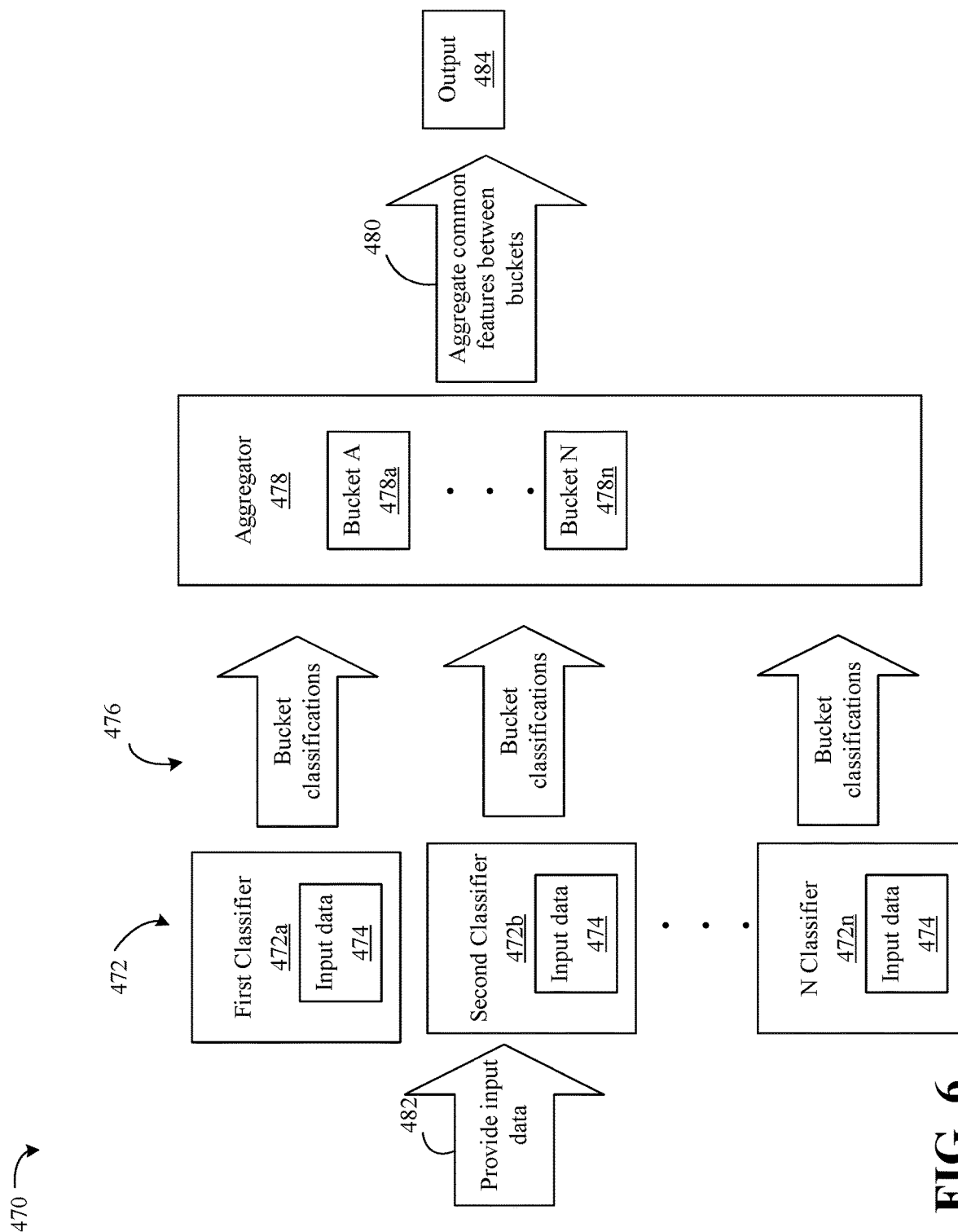
FIG. 6 is a process flow diagram of an example of classification and aggregation process according to an embodiment.

Turning now to FIG. 6, a classification and aggregation process 470 is illustrated. Process 470 may be implemented with the embodiments described herein, and may be readily implemented in the MACHs 122 of FIG. 1 for example. Furthermore, the process 470 may generally be implemented in with the embodiments described herein, such as, for example, the process 100 (FIG. 1), the method 800 (FIG. 2), the method 300 (FIG. 3), the method 350 (FIG. 4) and/or the method 450 (FIG. 5) already discussed.

As illustrated input data 474 is provided 482 to the classifiers 472. The classifiers 472 may classify the input data 474 into different buckets. The bucket classifications 476 may be provided to an aggregator 478. The aggregator 478 may maintain a running list of all buckets that the input data 474 is classified within by the classifiers 472. For example, the first classifier 472a may classify the input data 474 into Bucket A 478a. Thus, the aggregator 478 may store Bucket A. The N classifier 472n may classify input data 474 into Bucket N 478n. The N classifier 472b may likewise provide a bucket classification 476 to the aggregator 478.

The aggregator 478 may aggregate the selected buckets A 478a-478n and output the aggregated common features between the bucket A 478a-Bucket N 478n, 480. The common features may be centroids that are common to each of the bucket A 478a-Bucket N 478n, indexes (e.g., corresponding to centroids) that are common to the bucket A 478a-Bucket N 478n and so forth. The output 484 may be the aggregated common features and may be provided to a memory controller for further processing.

Figure 7:
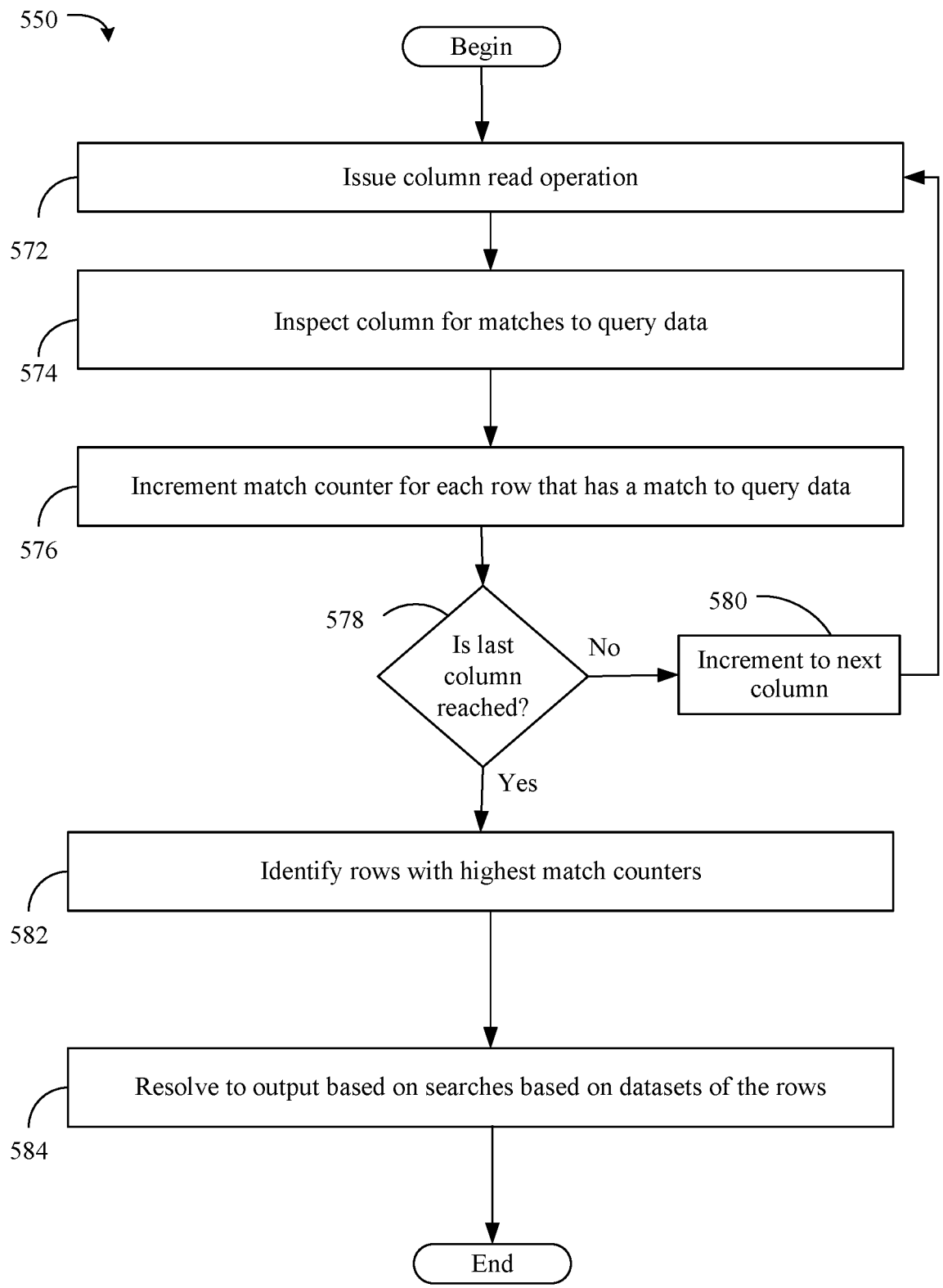
FIG. 7 is a flowchart of an example of a method of a stochastic associative search according to an embodiment.

FIG. 7 shows a SAS method 550. The method 550 may generally be implemented with the embodiments described herein such as, for example, the process 100 (FIG. 1), the method 800 (FIG. 2), the method 300 (FIG. 3) and/or the method 350 (FIG. 4), the method 450 (FIG. 5), and/or the process 470 (FIG. 6) already discussed. The method 550 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. In some embodiments, the method 550 may be implemented by a memory controller of an SAM.

Illustrated processing block 572 issues a column read operation. Illustrated processing block 574 inspect the column for matches to query data. Illustrated processing block 576 increments match counters for each row that has a match to query data. Illustrated processing block 578 identifies if the last column is reached. If not, illustrated processing block 580 increments to the next column. Otherwise, illustrated processing block 582 identifies rows with the highest match counters. Illustrated processing block 584 resolves to an output based on more refined searches among the rows that have the highest match counters.

Figure 8:
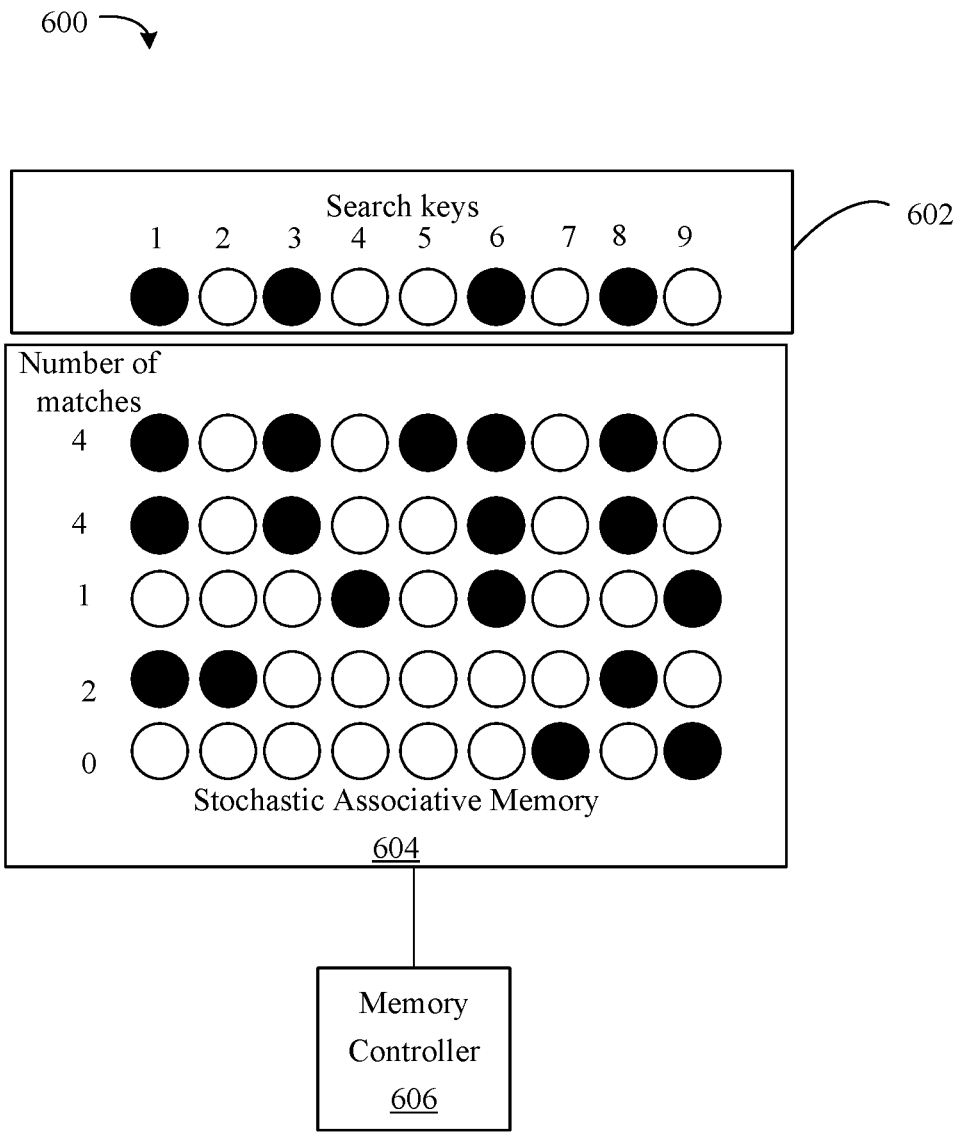
FIG. 8 is a block diagram of an example of a memory device according to an embodiment.

FIG. 8 illustrates a memory device 600 that may be implemented with the embodiments described herein, such as, for example, the process 100 (FIG. 1), the method 800 (FIG. 2), the method 300 (FIG. 3), the method 350 (FIG. 4), the method 450 (FIG. 5), the process 470 (FIG. 6) and/or the method 550 (FIG. 7) already discussed. The memory device 600 may execute a binary SAS based on the search keys 602. The search keys 602 may be a binary hash code that was converted from floating-point input data. A SAM 604 (e.g., 3D XPoint) may include binary hash coded centroids as well. A number of hits may correspond to the hamming distance between hash codes and the search keys 602. The column read enabled SAM 604 may search through a database of the centroids that are in the rows. Each row may include a different centroid that is a binary hashed format.

Thus, the SAM 604 may store a database of binary vectors (stored in row major fashion) and the memory device 600 may include binary search keys 602. The memory device 600 may have a column read acceleration to identify a set of nearest neighbors (e.g., the rows having the highest number of matching bits) by matching only the set bits (locations with "1's" as represented by black dots) in the key and counting the number of matches for each vector/row in the memory. It is worth noting that the white dots represent "0" values while the black dots represent "1" values.

This matching may occur in two steps. First, the memory controller 606 issues column read operations that repeatedly fetch blocks of data along selective columns corresponding to the set bits in the search keys 602. Second, the fetched columns are inspected for "1's" in the memory controller 606 and a "match counter" (illustrated as the "number of matches") is incremented for every row with a set bit. A certain number of top matches are considered for the nearest neighbors for the search keys 602 (e.g., a query). The top matches may be further be resolved by performing a linear search over that set of closest matches.

Figure 9:
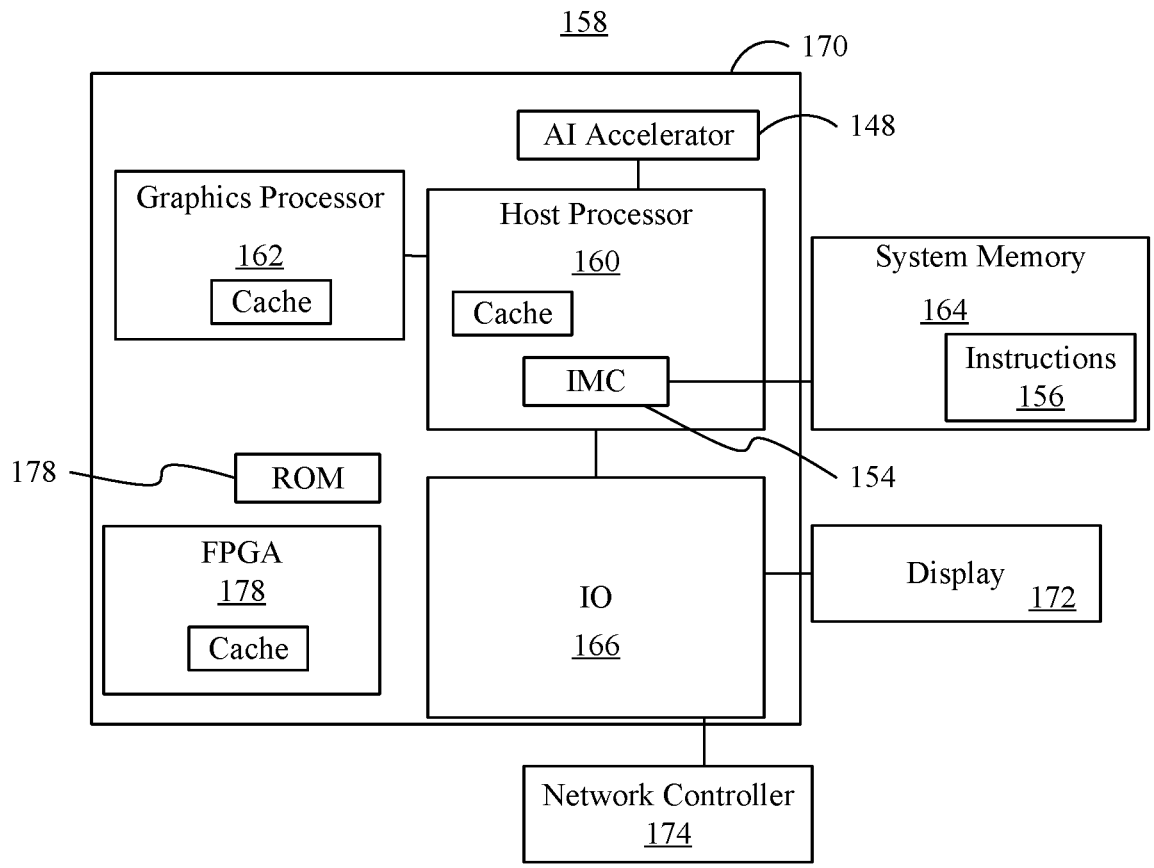
FIG. 9 is a block diagram of an example of a performance-enhanced computing system according to an embodiment.

Turning now to FIG. 9, a performance-enhanced query processing computing system 158 is shown. The system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 158 includes a host processor 160 (e.g., CPU) having an integrated memory controller (IMC) 154 that is coupled to a system memory 164.

The illustrated system 158 also includes an input output (10) module 166 implemented together with the host processor 160 and a graphics processor 162 (e.g., GPU) on a semiconductor die 170 as a system on chip (SoC). The illustrated 10 module 166 communicates with, for example, a display 172 (e.g., touch screen, liquid crystal display/LCD, light emitting diode/LED display), a network controller 174 (e.g., wired and/or wireless), and mass storage 168 (e.g., hard disk drive/HDD, optical disk, solid state drive/SSD, flash memory). Furthermore, the SoC 170 may further include processors (not shown) and/or AI accelerator 148 dedicated to artificial intelligence (AI) and/or neural network (NN) processing. For example, the system SoC 170 may include vision processing units (VPUs,) and/or other AI/NN-specific processors such as AI accelerator 148, etc. In some embodiments, any aspect of the embodiments described herein may be implemented in the processors and/or accelerators dedicated to AI and/or NN processing such as AI accelerator 148, the graphics processor 162 and/or the host processor 160.

The host processor 160, the graphics processor 162, the FPGA 178 and/or the 10 module 166 may execute instructions 156 retrieved from the system memory 164 and/or the mass storage. In an embodiment, the computing system 158 is operated to execute a MACH process to classify input data. In some embodiments, one or more of the host processor 160, the graphics processor 162, the FPGA 178 may execute the MACH process based on data in caches. For example, if the GPU 162 were to execute the MACH process, the GPU 162 may access the system memory 164 once to retrieve data, and thereafter execute the remainder of the MACH process without accessing the system memory 164 and based on data in the cache of the GPU 162. The host processor 160 and the FPGA 178 may similarly execute the MACH process by storing data in respective caches. The system memory 164 may store data of clusters (e.g., centroids). The system memory 164 may be an SAM based memory that allows for column read to implement a SAS process. For example, the output of the MACH process may be provided to the system memory 164 that may in turn further process the output to identify a best match for the input data.

When the instructions 156 are executed, the computing system 158 may implement one or more aspects of the embodiments described herein. For example, the system 158 may implement one or more aspects of the process 100 (FIG. 1), the method 800 (FIG. 2), the method 300 (FIG. 3), the method 350 (FIG. 4), the method 450 (FIG. 5), the process 470 (FIG. 6), the method 550 (FIG. 7) and/or the memory device 600 (FIG. 8) already discussed.

The illustrated computing system 158 is therefore considered to be performance-enhanced at least to the extent that it enables the computing system 158 to take advantage of MACH processes to reduce latency, overhead and memory accesses.

Figure 10:
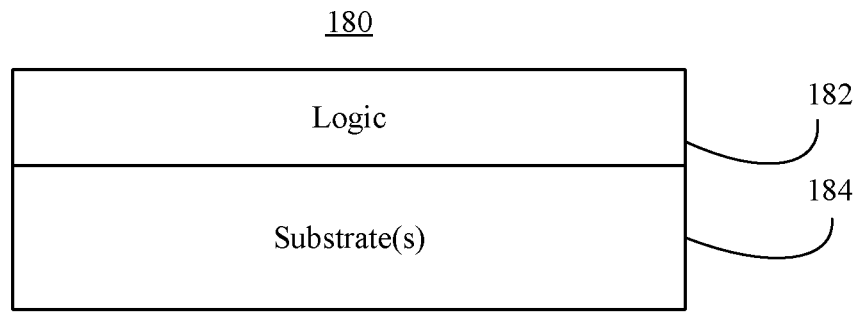
FIG. 10 is an illustration of an example of a semiconductor apparatus according to an embodiment.

FIG. 10 shows a semiconductor apparatus 180 (e.g., chip, die, package). The illustrated apparatus 180 includes one or more substrates 184 (e.g., silicon, sapphire, gallium arsenide) and logic 182 (e.g., transistor array and other integrated circuit/IC components) coupled to the substrate(s) 184. In an embodiment, the apparatus 180 is operated in an application development stage and the logic 182 performs one or more aspects of the process 100 (FIG. 1), the method 800 (FIG. 2), the method 300 (FIG. 3), the method 350 (FIG. 4), the method 450 (FIG. 5), the process 470 (FIG. 6), the method 550 (FIG. 7) and/or the memory device 600 (FIG. 8) already discussed. Thus, the logic 182 may store buckets that represent a plurality of clusters in a cache, where each of the buckets is to represent a group of the plurality of clusters and further where the plurality of clusters is in a first data format, modify input data from a second data format to the first data format and conduct a similarity search based on the input data in the first data format to assign the input data to at least one bucket of the buckets. Furthermore, the logic 182 may further include processors (not shown) and/or AI accelerator dedicated to artificial intelligence AI and/or NN processing. For example, the system logic 182 may include VPUs, and/or other AI/NN-specific processors such as AI accelerators, etc. In some embodiments, any aspect of the embodiments described herein may be implemented in the processors and/or accelerators dedicated to AI and/or NN processing such as AI accelerators.

The logic 182 may be implemented at least partly in configurable logic or fixed-functionality hardware logic. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 11:
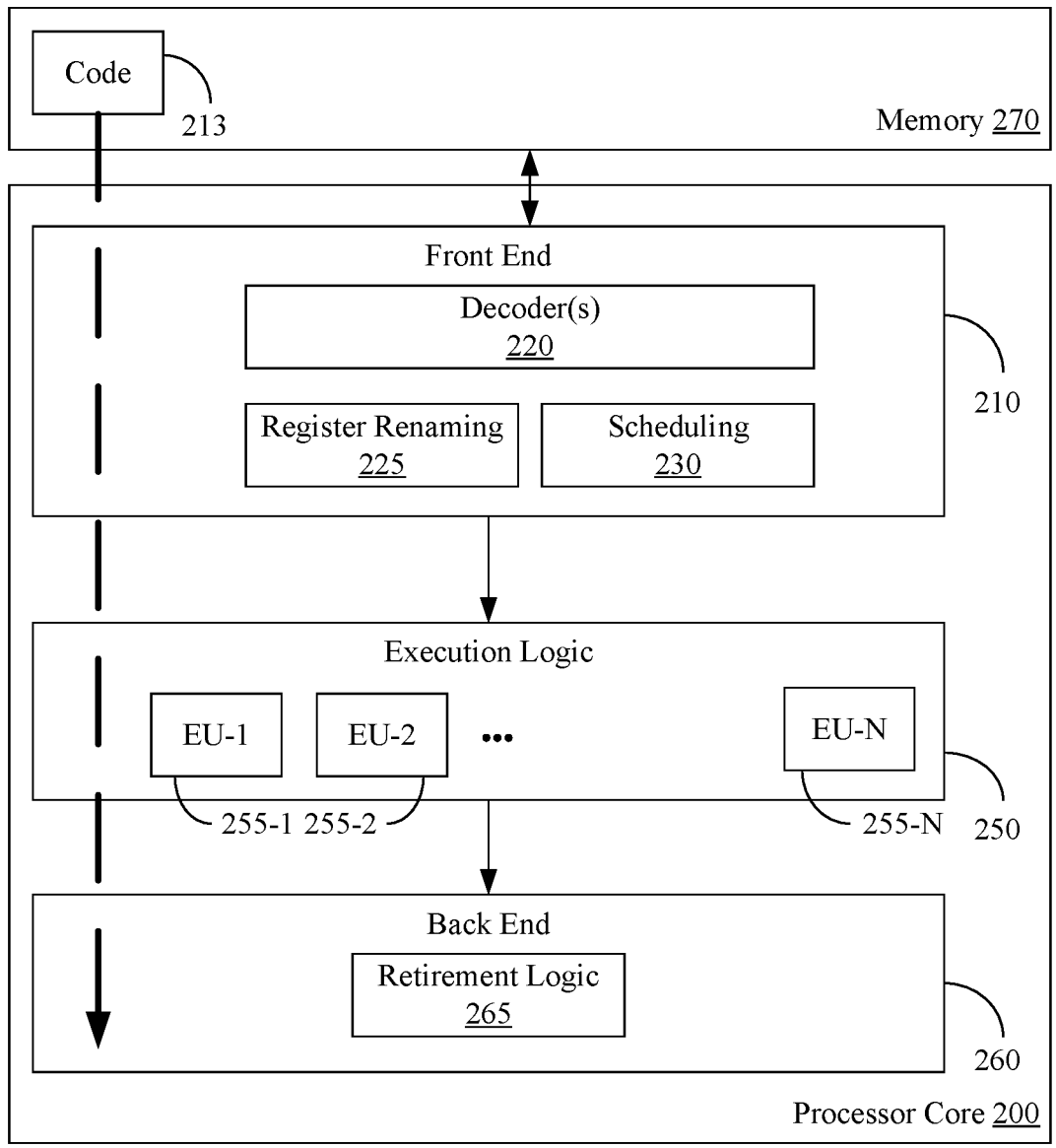
FIG. 11 is a block diagram of an example of a processor according to an embodiment.

FIG. 11 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 11, a processing element may alternatively include more than one of the processor core 200 illustrated in FIG. 11. The processor core 200 may be a single-threaded core or, for at least one embodiment, the processor core 200 may be multithreaded in that it may include more than one hardware thread context (or "logical processor") per core.

FIG. 11 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the embodiments such as, for example, the process 100 (FIG. 1), the method 800 (FIG. 2), the method 300 (FIG. 3), the method 350 (FIG. 4), the method 450 (FIG. 5), the process 470 (FIG. 6), the method 550 (FIG. 7) and/or the memory device 600 (FIG. 8) already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 11, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 12:
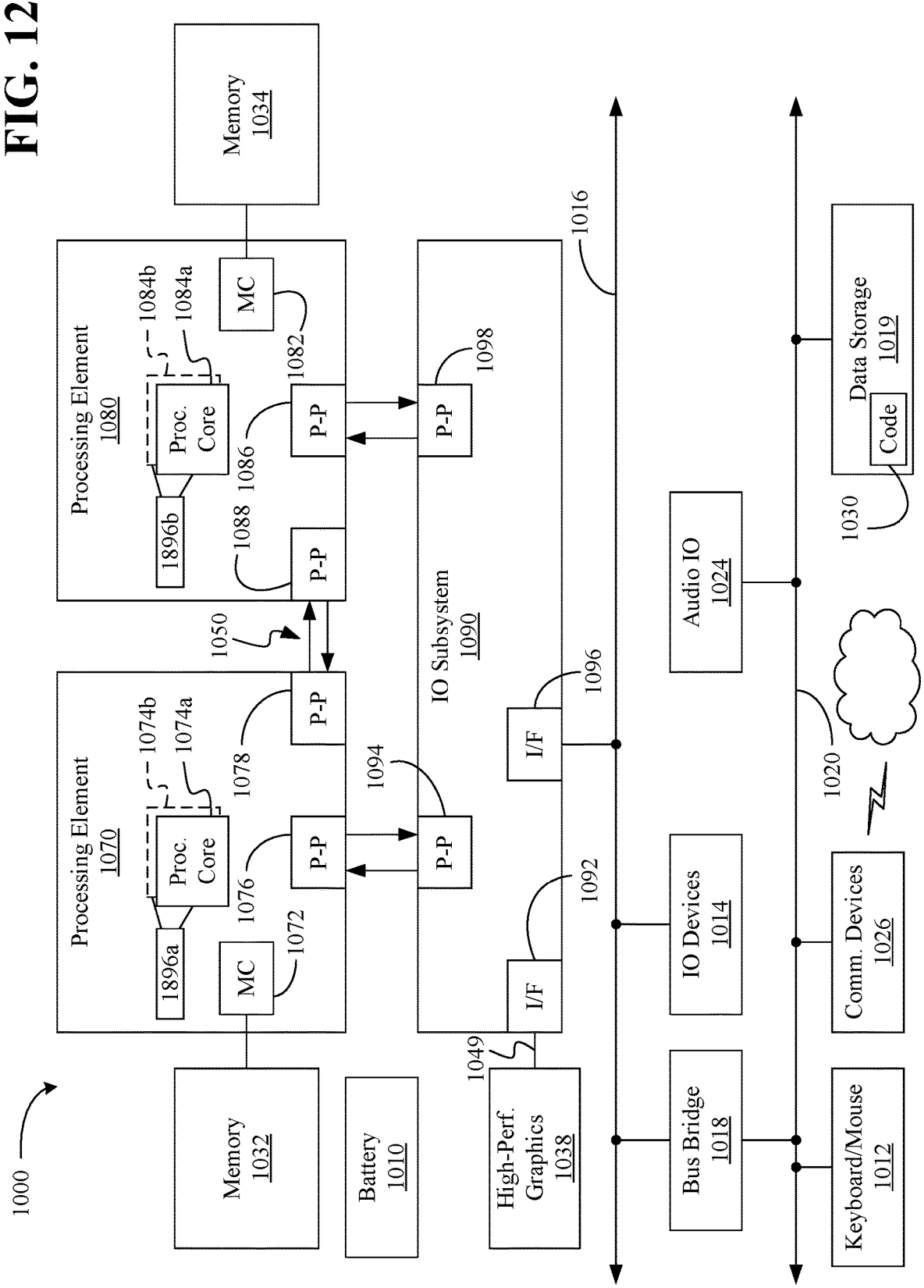
FIG. 12 is a block diagram of an example of a multi-processor based computing system according to an embodiment.

Referring now to FIG. 12, shown is a block diagram of a computing system 1000 embodiment in accordance with an embodiment. Shown in FIG. 12 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 12 may be implemented as a multi-drop bus rather than point-to-point interconnect.

As shown in FIG. 12, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 11.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 12, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 12, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the one or more aspects of such as, for example, the process 100 (FIG. 1), the method 800 (FIG. 2), the method 300 (FIG. 3), the method 350 (FIG. 4), the method 450 (FIG. 5), the process 470 (FIG. 6), the method 550 (FIG. 7) and/or the memory device 600 (FIG. 8) already discussed, already discussed. Further, an audio I/O 1024 may be coupled to second bus 1020 and a battery 1010 may supply power to the computing system 1000.

Note that other embodiments are contemplated. For example, instead of the point-to-point architecture of FIG. 12, a system may implement a multi-drop bus or another such communication topology. Also, the elements of FIG. 12 may alternatively be partitioned using more or fewer integrated chips than shown in FIG. 12.

ADDITIONAL NOTES AND EXAMPLES

Example 1 includes a computing system including a data storage that is to store data associated with a plurality of clusters that are each in a first data format, a system-on-chip coupled to the data storage and that is to include a cache, a memory including a set of executable program instructions, which when executed by the system-on-chip, cause the computing system to store a plurality of classes that represent the plurality of clusters in the cache, wherein each of the classes is to represent a group of the plurality of clusters, modify input data from a second data format to the first data format, and conduct a similarity search based on the input data in the first data format to assign the input data to at least one class of the plurality of classes.

Example 2 includes the computing system of Example 1, wherein the instructions, when executed, further cause the computing system to apply a hash function to the input data to convert the input data from the second data format to the first data format.

Example 3 includes the computing system of Example 1, wherein the similarity search is to include a Merged-Averaged Classifiers via Hashing process on the first data in the first data format to classify the first data into at least two classes of the at least one class.

Example 4 includes the computing system of Example 1, wherein the instructions, when executed, further cause the computing system to classify, with a first classifier, the input data in the first data format to a first class of the at least one class, classify, with a second classifier, the input data in the first data format to a second class of the at least one class, and conduct an identification that at least one cluster from the plurality of clusters is to be represented by both the first class and the second class to execute the similarity search.

Example 5 includes the computing system of Example 4, wherein the at least one cluster includes at least two clusters, and the instructions, when executed, further cause the computing system to in response to the identification, execute a stochastic associative search associated with the at least two clusters to identify a final cluster from the at least two clusters that is the highly similar to the input data, and assign the input data to the final cluster.

Example 6 includes the computing system of any one of Example 1 to 5, wherein the data storage is a stochastic associative memory.

Example 7 includes a semiconductor apparatus including one or more substrates, and logic coupled to the one or more substrates, wherein the logic is implemented in one or more of configurable logic or fixed-functionality logic hardware, the logic coupled to the one or more substrates to store a plurality of classes that represent a plurality of clusters in a cache, wherein each of the classes is to represent a group of the plurality of clusters and further wherein the plurality of clusters are to be in a first data format, modify input data from a second data format to the first data format, and conduct a similarity search based on the input data in the first data format to assign the input data to at least one class of the classes.

Example 8 includes the apparatus of Example 7, wherein the logic coupled to the one or more substrates is to apply a hash function to the input data to convert the input data from the second data format to the first data format.

Example 9 includes the apparatus of Example 7, wherein the similarity search is to include a Merged-Averaged Classifiers via Hashing process on the first data in the first data format to classify the first data into at least two classes of the at least one class.

Example 10 includes the apparatus of Example 7, wherein the logic coupled to the one or more substrates is to classify, with a first classifier, the input data in the first data format to a first class of the at least one class, classify, with a second classifier, the input data in the first data format to a second class of the at least one class, and conduct an identification that at least one cluster from the plurality of clusters is to be represented by both the first class and the second class to execute the similarity search.

Example 11 includes the apparatus of Example 10, wherein the at least one cluster includes at least two clusters, and further wherein the logic coupled to the one or more substrates is to in response to the identification, execute a stochastic associative search associated with the at least two clusters to identify a final cluster from the at least two clusters that is highly similar to the input data, and assign the input data to the final cluster.

Example 12 includes the apparatus of any one of Examples 7-11, wherein a stochastic associative memory is to store the plurality of clusters.

Example 13 includes the apparatus of any one of Examples 7 to 11, wherein the logic coupled to the one or more substrates includes transistor channel regions that are positioned within the one or more substrates.

Example 14 includes at least one computer readable storage medium including a set of executable program instructions, which when executed by a computing system, cause the computing system to store a plurality of classes that represent a plurality of clusters in a cache, wherein each of the classes is to represent a group of the plurality of clusters and further wherein the plurality of clusters is to be in a first data format, modify input data from a second data format to the first data format, and conduct a similarity search based on the input data in the first data format to assign the input data to at least one class of the classes.

Example 15 includes the at least one computer readable storage medium of Example 14, wherein the instructions, when executed, further cause the computing system to apply a hash function to the input data to convert the input data from the second data format to the first data format.

Example 16 includes the at least one computer readable storage medium of Example 14, wherein the similarity search is to include a Merged-Averaged Classifiers via Hashing process on the first data in the first data format to classify the first data into at least two classes of the at least one class.

Example 17 includes the at least one computer readable storage medium of Example 14, wherein the instructions, when executed, further cause the computing system to classify, with a first classifier, the input data in the first data format to a first class of the at least one class, classify, with a second classifier, the input data in the first data format to a second class of the at least one class, and conduct an identification that at least one cluster from the plurality of clusters is to be represented by both the first class and the second class to execute the similarity search.

Example 18 includes the at least one computer readable storage medium of Example 17, wherein the at least one cluster includes at least two clusters, and further wherein the instructions, when executed, further cause the computing system to in response to the identification, execute a stochastic associative search associated with the at least two clusters to identify a final cluster from the at least two clusters that is highly similar to the input data, and assign the input data to the final cluster.

Example 19 includes the at least one computer readable storage medium of any one of Examples 14 to 18, wherein a stochastic associative memory is to store the plurality of clusters.

Example 20 includes a method of operating a computing system, the method including storing a plurality of classes that represent a plurality of clusters in a cache, wherein each of the classes represents a group of the plurality of clusters and further wherein the plurality of clusters is in a first data format, modifying input data from a second data format to the first data format, and conducting a similarity search based on the input data in the first data format to assign the input data to at least one class of the classes.

Example 21 includes the method of Example 20, further including applying a hash function to the input data to convert the input data from the second data format to the first data format.

Example 22 includes the method of Example 20, wherein the similarity search includes a Merged-Averaged Classifiers via Hashing process on the first data in the first data format to classify the first data into at least two classes of the at least one class.

Example 23 includes the method of Example 20, further including classifying, with a first classifier, the input data in the first data format to a first class of the at least one class, classifying, with a second classifier, the input data in the first data format to a second class of the at least one class, and conducting an identification that at least one cluster from the plurality of clusters is represented by both the first class and the second class to execute the similarity search.

Example 24 includes the method of Example 23, wherein the at least one cluster includes at least two clusters, and the method further includes in response to the identification, executing a stochastic associative search associated with the at least two clusters to identify a final cluster from the at least two clusters that is highly similar to the input data, and assigning the input data to the final cluster.

Example 25 includes the method of any one of Examples 20 to 24, wherein a stochastic associative memory is to store the plurality of clusters.

Example 26 includes a semiconductor apparatus including means for storing a plurality of classes that represent a plurality of clusters in a cache, wherein each of the classes represents a group of the plurality of clusters and further wherein the plurality of clusters is in a first data format, means for modifying input data from a second data format to the first data format, and means for conducting a similarity search based on the input data in the first data format to assign the input data to at least one class of the classes.

Example 27 includes the apparatus of Example 26, further including means for applying a hash function to the input data to convert the input data from the second data format to the first data format.

Example 28 includes the apparatus of Example 26, wherein the means for conducting the similarity search is to include means for executing a Merged-Averaged Classifiers via Hashing process on the first data in the first data format to classify the first data into at least two classes of the at least one class.

Example 29 includes the apparatus of Example 26, further including means for classifying, with a first classifier, the input data in the first data format to a first class of the at least one class, means for classifying, with a second classifier, the input data in the first data format to a second class of the at least one class, and means for conducting an identification that at least one cluster from the plurality of clusters is represented by both the first class and the second class to execute the similarity search.

Example 30 includes the apparatus of Example 29, wherein the at least one cluster includes at least two clusters, and the method further includes means for in response to the identification, executing a stochastic associative search associated with the at least two clusters to identify a final cluster from the at least two clusters that is highly similar to the input data, and means for assigning the input data to the final cluster.

Example 31 includes the apparatus of any one of Examples 26 to 30, wherein a stochastic associative memory is to store the plurality of clusters.

Thus, technology described herein may provide for an enhanced classification and query analysis that may efficiently retrieve results. Furthermore, clusters may be stored in binary hash versions to facilitate low latency analysis. The embodiments described herein may also reduce memory footprints and latency with MACH analysis and searches based on the MACH analysis.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a data storage that is to store data associated with a plurality of clusters that are each in a first data format;
a system-on-chip coupled to the data storage and that is to include a cache; and
a memory including a set of executable program instructions, which when executed by the system-on-chip, cause the computing system to:
store a plurality of classes that represent the plurality of clusters in the cache, wherein each of the classes is to represent a group of the plurality of clusters;
modify input data from a second data format to the first data format;
conduct a similarity search based on the input data in the first data format to assign the input data to a first class of the plurality of classes and a second class of the plurality of classes, and identify that at least two clusters from the plurality of clusters are to be represented by both the first class and the second class; and execute a stochastic associative search associated with the at least two clusters to identify a final cluster from the at least two clusters that is similar to the input data.

2. The computing system of claim 1, wherein the instructions, when executed, further cause the computing system to:
apply a hash function to the input data to convert the input data from the second data format to the first data format.

3. The computing system of claim 1, wherein the similarity search is to include a Merged-Averaged Classifiers via Hashing process on the first data in the first data format to classify the first data into the first and second classes.

4. The computing system of claim 1, wherein to conduct the similarity search, the instructions, when executed, further cause the computing system to:
classify, with a first classifier, the input data in the first data format to the first class; and
classify, with a second classifier, the input data in the first data format to the second class.

5. The computing system of claim 4, wherein the instructions, when executed, further cause the computing system to:
determine that the stochastic associative search is to be executed in response to the two clusters being represented by both the first class and the second class; and
assign the input data to the final cluster.

6. The computing system of claim 1, wherein the data storage is a stochastic associative memory.

7. A semiconductor apparatus comprising:
one or more substrates; and
logic coupled to the one or more substrates, wherein the logic is implemented in one or more of configurable logic or fixed-functionality logic hardware, the logic coupled to the one or more substrates to:
store a plurality of classes that represent a plurality of clusters in a cache, wherein each of the classes is to represent a group of the plurality of clusters and further wherein the plurality of clusters is to be in a first data format;
modify input data from a second data format to the first data format;
conduct a similarity search based on the input data in the first data format to assign the input data to a first class of the plurality of classes and a second class of the plurality of classes, and identify that at least two clusters from the plurality of clusters are to be represented by both the first class and the second class; and
execute a stochastic associative search associated with the at least two clusters to identify a final cluster from the at least two clusters that is similar to the input data.

8. The apparatus of claim 7, wherein the logic coupled to the one or more substrates is to:
apply a hash function to the input data to convert the input data from the second data format to the first data format.

9. The apparatus of claim 7, wherein the similarity search is to include a Merged-Averaged Classifiers via Hashing process on the first data in the first data format to classify the first data into the first and second classes.

10. The apparatus of claim 7, wherein to conduct the similarity search, the logic coupled to the one or more substrates is to:
classify, with a first classifier, the input data in the first data format to the first class; and
classify, with a second classifier, the input data in the first data format to the second class.

11. The apparatus of claim 10, wherein the logic coupled to the one or more substrates is to:
determine that the stochastic associative search is to be executed in response to the two clusters being represented by both the first class and the second class; and
assign the input data to the final cluster.

12. The apparatus of claim 7, wherein a stochastic associative memory is to store the plurality of clusters.

13. The apparatus of claim 7, wherein the logic coupled to the one or more substrates includes transistor channel regions that are positioned within the one or more substrates.

14. At least one non-transitory computer readable storage medium comprising a set of executable program instructions, which when executed by a computing system, cause the computing system to:
store a plurality of classes that represent a plurality of clusters in a cache, wherein each of the classes is to represent a group of the plurality of clusters and further wherein the plurality of clusters is to be in a first data format;
modify input data from a second data format to the first data format;
conduct a similarity search based on the input data in the first data format to assign the input data to a first class of the plurality of classes and a second class of the plurality of classes, and identify that at least two clusters from the plurality of clusters are to be represented by both the first class and the second class; and
execute a stochastic associative search associated with the at least two clusters to identify a final cluster from the at least two clusters that is similar to the input data.

15. The at least one non-transitory computer readable storage medium of claim 14, wherein the instructions, when executed, further cause the computing system to:
apply a hash function to the input data to convert the input data from the second data format to the first data format.

16. The at least one non-transitory computer readable storage medium of claim 14, wherein the similarity search is to include a Merged-Averaged Classifiers via Hashing process on the first data in the first data format to classify the first data into the first and second classes.

17. The at least one non-transitory computer readable storage medium of claim 14, wherein to conduct the similarity search, the instructions, when executed, further cause the computing system to:
classify, with a first classifier, the input data in the first data format to the first class; and
classify, with a second classifier, the input data in the first data format to the second class.

18. The at least one non-transitory computer readable storage medium of claim 17, wherein the instructions, when executed, further cause the computing system to:
determine that the stochastic associative search is to be executed in response to the two clusters being represented by both the first class and the second class; and
assign the input data to the final cluster.

19. The at least one non-transitory computer readable storage medium of claim 14, wherein a stochastic associative memory is to store the plurality of clusters.

20. A method of operating a computing system, the method comprising:
storing a plurality of classes that represent a plurality of clusters in a cache, wherein each of the classes represents a group of the plurality of clusters and further wherein the plurality of clusters is in a first data format;

modifying input data from a second data format to the first data format;

conducting a similarity search based on the input data in the first data format to assign the input data to a first class of the plurality of classes and a second class of the plurality of classes, and identify that at least two clusters from the plurality of clusters are represented by both the first class and the second class; and executing a stochastic associative search associated with the at least two clusters to identify a final cluster from the at least two clusters that is similar to the input data.

21. The method of claim 20, further comprising:

applying a hash function to the input data to convert the input data from the second data format to the first data format.

22. The method of claim 20, wherein the similarity search includes a Merged-Averaged Classifiers via Hashing process on the first data in the first data format to classify the first data into the first and second classes.

23. The method of claim 20, wherein the conducting the similarity search comprises:

classifying, with a first classifier, the input data in the first data format to the first class; and classifying, with a second classifier, the input data in the first data format to the second class.

24. The method of claim 23, further comprising:

determining that the stochastic associative search will be executed in response to the two clusters being represented by both the first class and the second class; and assigning the input data to the final cluster.

25. The method of claim 20, wherein a stochastic associative memory is to store the plurality of clusters.

* * * * *